No. 817,062. PATENTED APR. 3, 1906.
W. HART.
GRAPHOPHONE REPRODUCER.
APPLICATION FILED AUG. 14, 1905.
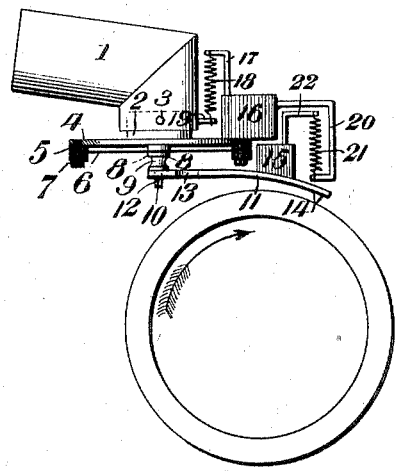
Witnesses
Inventor
Wm. Hart.
by
Attorney

UNITED STATES PATENT OFFICE.

WILLIAM HART, OF KIRKSVILLE, MISSOURI.

GRAPHOPHONE-REPRODUCER.

No. 817,062.  Specification of Letters Patent.  Patented April 3, 1906.

Application filed August 14, 1905. Serial No. 274,146.

*To all whom it may concern:*

Be it known that I, WILLIAM HART, a citizen of the United States, residing at Kirksville, in the county of Adair and State of Missouri, have invented certain new and useful Improvements in Graphophone-Reproducers; and I do declare the following to be a full, clear, and exact description of the invention, such as will enable others skilled in the art to which it appertains to make and use the same.

This invention relates to reproducers for graphophones, phonographs, and other talking-machines; and one of the principal objects of the same is to provide means for preventing the jarring or jolting of the stylus in passing over the sound-grooves of the record.

Another object is to provide means for varying the volume or giving greater or less amplitude to the production or record.

These and other objects are attained by means of the construction illustrated in the accompanying drawing, in which the figure is a side elevation and partial section of a reproducer made in accordance with my invention.

Referring to the drawing for a more particular description of my invention, the numeral 1 designates the horn-supporting elbow or intake of the reproducer, said elbow being supported upon a short tubular piece 2 by means of a pin 3, forming a pivot between the elbow 1 and the tube 2. The sound-box consists of a disk 4, to which the rings 5 are secured, and the diaphragm 6 is connected to the disk by means of screws 7, which pass through the disk and through the rings and hold the diaphragm in place between said rings. A hub 8 is provided with a pin or projection 9, which passes centrally through the diaphragm, and at its lower end said hub is provided with an integral projection 10, said projection passing through a hole in the stylus-lever 11 and being secured thereto by means of a pin 12. The said lever 11 is provided with a spring portion at 13, and a stylus 14 is secured to the outer end of said lever. Supported upon said lever is a weight 15, and supported upon the disk 4 is a weight 16. These weights may be secured in place by any suitable means, as by pins or small screws (not shown) passing upward through the lever 11 and through the disk 4 into the weights. Projecting upwardly from the weight 16 is an arm 17, and secured to this arm at one end is a spring 18, the opposite end of the spring being connected to a pin 19, projecting back from the elbow or intake 1. An arm 20 depends from the weight 16, and a spring 21 is secured to the depending arm at one end, and its opposite end is connected to a bar 22, overhanging the weight 15.

From the foregoing it will be obvious that as the diaphragm is rigidly secured to a hub connected to the stylus-lever any vibration of the stylus will be directly communicated to the diaphragm and that the weights and springs connected to the stylus-lever will have a tendency to give stability to the stylus in its movement over the record and give increased amplitude to the reproduction. However, should it be desired to produce a record without giving increased volume the weights may be removed. In such condition the instrument may be used for teaching languages or for the use of a type-writer and for other purposes not requiring a loud reproduction.

Various changes in the form, proportion, and the minor details of construction may be resorted to without departing from the principle or sacrificing any of the advantages of this invention.

Having thus described my invention, what I claim as new, and desire to secure by Letters Patent, is—

1. In a reproducer of the character described, a diaphragm, a hub secured centrally thereto, a stylus-lever connected to said hub, a horn-intake, and a tube pivotally connected to said horn-intake, and disposed above the upper end of said hub, substantially as described.

2. A reproducer for graphophones comprising a sound-box, a weight thereon, a spring connected to said weight and to the horn-intake, a weight supported upon the stylus-lever, and a spring connected to said weight at one end and having its opposite end connected to an arm depending from the first-mentioned weight, substantially as described.

In testimony whereof I have hereunto set my hand in presence of two subscribing witnesses.

WILLIAM HART.

Witnesses:
 W. J. WALL,
 R. H. WHITZEL.